United States Patent [19]

Allabashi

[11] 4,011,114
[45] Mar. 8, 1977

[54] CROSS-LINKED NITROCELLULOSE PROPELLANT FORMULATION
[75] Inventor: John C. Allabashi, Cumberland, Md.
[73] Assignee: The United States of America as represented by the Secretary of the Navy, Washington, D.C.
[22] Filed: Apr. 9, 1964
[21] Appl. No.: 358,981
[52] U.S. Cl. .............................. 149/19.4; 149/19.8; 149/19.92; 149/20; 149/95; 149/98; 264/3 R
[51] Int. Cl.[2] ......................................... C06B 45/10
[58] Field of Search .............................. 149/17–19, 149/37, 38, 97–99, 19.4, 19.8, 19.92, 20, 95; 264/3

[56] References Cited
UNITED STATES PATENTS 3,002,830 10/1961 Barr ...................................... 149/19
3,036,939 5/1962 Camp ................................... 149/19

Primary Examiner—Edward A. Miller
Attorney, Agent, or Firm—R. S. Sciascia; Roy Miller; Lloyd E. K. Pohl

EXEMPLARY CLAIM

1. A propellant formulation comprising the following ingredients:
 Nitrocellulose
 Prepolymer of polyglycoladipate and 2,4-tolylene diisocyanate
 Nitroglycerin
 Cyclotetramethylenetetranitramine
 Aluminum
 2-Nitrodiphenylamine.

6. A propellant composition consisting essentially of:
 the prepolymer of polyglycoladipate and 2,4-tolylene diisocyanate;
 nitrocellulose, and
 nitroglycerin.

8 Claims, No Drawings

CROSS-LINKED NITROCELLULOSE PROPELLANT FORMULATION

The present invention relates to an improved propellant formulation and to the method of preparation thereof.

In the field of rocket propellants there exists a great number of homogeneous propellants using nitrocellulose as the basic ingredient to give them the structural characteristics of a plastic which can be processed in many shapes. If the propellant contains nitroglycerin as a second combustible ingredient, the propellant is generally known as a double base propellant. Double base propellants characteristically have high brittle points, that is, the modulus is high and elongation is very low at low temperatures (<0° F.). Furthermore, at high temperatures (~120° F.) the propellant tends to become soft, that is, tensile strength and modulus are reduced significantly, such that creep becomes a serious problem under these conditions. Previous attempts to improve mechanical properties of double base propellants included the use of diisocyanates such as tolylene diisocyanate (TDI), hexamethylene diisocyanate (HDI), anhydrides, polymerization of the acrylate and methacrylate esters, in addition to the use of divalent cations on carboxymethyl nitrocellulose. Improvements have been made in tensile strength and modulus of ambient and high temperatures, but the propellants were still as brittle as the uncrosslinked counterparts at low temperatures. Other attempts have been made to crosslink nitrocellulose by use of prepolymers, especially polytetramethylene ether glycol and tolylenediisocyanate. However, these were unsuccessful in that porous propellant always resulted. The difficulty here was attributed to the fact that the polyether was not a solvent for nitrocellulose. Because of this, the long chain diisocyanate diffused very slowly into nitrocellulose such that the reaction with residual moisture predominated over the reaction with nitrocellulose. Since the water-isocyanate reaction releases $CO_2$, void free propellant could not be made. In order to circumvent this difficulty a prepolymer which was a solvent for nitrocellulose and nitroglycerin was tried. This was successful and the present invention resulted.

The general purpose of this invention is to provide a propellant formulation which has improved mechanical properties.

It is therefore an object of the present invention to provide a high impulse propellant with good mechanical properties.

Another object is to provide a propellant which is safe to manufacture.

A further object is to provide a propellant which has high tensile strength and can be used in systems having high temperature application.

Still another object of the invention is the provision of a propellant with increased elongation and lower modulus which makes it suitable for low temperature applications.

Other objects, features, and many of the attendant advantages of this invention will become readily appreciated as the same become better understood by reference to the following detailed description.

This invention is concerned with an improved solid propellant by using prepolymers as crosslinking agents for nitrocellulose/nitroglycerin propellants. The nature of the prepolymer is important. It must be a solvent or potential solvent for nitrocellulose; it must be miscible with nitroglycerin. Actually if it is a solvent for nitrocellulose, it will as a result be soluble in nitroglycerin. In the present invention a polyester was used. However, it does not have to be limited to this kind of material; any material fulfilling the above requirements should be applicable. Diisocyanates were used because of convenience, availability, and ease of reaction with nitrocellulose. Any functional group capable of reacting with residual hydroxyls of nitrocellulose and at the same time not split out any condensation products such as water should work.

The following examples will better illustrate this invention but should not be considered as limiting.

EXAMPLE I

| Ingredients | Percent by weight |
| --- | --- |
| Nitrocellulose (NC) | 14 |
| Prepolymer of polyglycoladipate and 2,4-tolylene diisocyanate (PGA-TDI) | 6 |
| Nitroglycerin (NG) | 26 |
| Cyclotetramethylenetetranitramine (HMX) | 45 |
| Aluminum (Al) | 18 |
| 2-Nitrodiphenylamine (NDPA) | 1 |

All the above materials were carefully dried. Moisture content lower than 0.05% for all materials is necessary. The prepolymer of polyglycoladipate and tolylene diisocyanate (PGA-TDI) was dissolved in dry nitroglycerin (NG) containing stabilizer 2-nitrodiphenylamine (NDPA). The resultant solution was evacuated for about 20 minutes to remove air. This resultant solution was then placed in a mixer into which dry plastisol nitrocellulose (12.6%N) (NC) was added and mixed for about three minutes. The oxidizer, cyclotetramethylenetetranitramine (HMX) of $175\mu$ particle size, was then added and mixed for 10 minutes. To this mixture spherical aluminum ($7\mu$ size) was added and mixed for five minutes forming a slurry which was mixed for an additional 15 minutes under vacuum. The propellant slurry was then vacuum cast into an appropriate mold and cured for about 5 days at 120° F.

This formulation containing about 10% prepolymer gave the following physical characteristics:

| | | |
| --- | --- | --- |
| Viscosity | (cp at 10 RPM) | - 20,000; |
| Density | (gms/cc) | - 1.83; |
| Specific Impulse | $\left(\frac{lbf.sec}{lbm}\right)$ | - 273.6 |

EXAMPLE II

| Ingredients | Percent by weight |
| --- | --- |
| Nitrocellulose | 9 |
| Prepolymer of polyglycoladipate and tolylene diisocyanate | 6 |
| Nitroglycerin | 26 |
| Cyclotetramethylenetetranitramine | 40 |
| Aluminum | 18 |
| 2-Nitrodiphenylamine | 1 |

The above ingredients were carefully dried and processed by the same method described in Example I herein.

This formulation containing about 15% prepolymer gave the following physical properties:

| | | | |
|---|---|---|---|
| Viscosity | (cp at 10 RPM) | — | 32,400; |
| Density | (gms/cc) | — | 1.82; |
| Specific Impulse | | — | 272.4. |

EXAMPLE III

EXAMPLE III

| Ingredients | Percent by weight |
|---|---|
| Nitrocellulose | 14 |
| Prepolymer of polyglycoladipate and tolylene diisocyanate | 6 |
| Nitroglycerin | 26 |
| Cyclotetramethylenetetranitramine | 35 |
| Aluminum | 18 |
| 2-Nitrodiphenylamine | 1 |

The above ingredients were carefully dried and processed by the same method described in Example I.

This formulation containing about 20% prepolymer gave the following physical characteristics:

| | | | |
|---|---|---|---|
| Viscosity | (cp at 10 RPM) | — | 82,800; |
| Density | (gms/cc) | — | 1.80; |
| Specific Impulse | | — | 271.1. |

When ammonium perchlorate oxidizer is used, magnesium oxide or metadimethoxybenzene are added as stabilizers in addition to 2-nitrodiphenylamine.

The following table is a comparison of the mechanical properties of the three formulations, set out herein, with a non-crosslinked propellant having equivalent specific impulse.

TABLE I

Mechanical Properties of Crosslinked vs Non-Crosslinked Propellants at −40° F.

| Sample | Tensile Strength (psi) | Elongation (%) | Modulus (psi) |
|---|---|---|---|
| Example I | 328 | 54 | 4700 |
| Example II | 620 | 35 | 7700 |
| Example III | 900 | 22 | 27,000 |
| Non-Crosslinked | 1800 | 8 | 50,000 |

TABLE II

Mechanical Properties of Crosslinked vs Non-Crosslinked Propellants at 80° F.

| Sample | Tensile Strength (psi) | Elongation (%) | Modulus (psi) |
|---|---|---|---|
| Example I | 107 | 74 | 415 |
| Example II | 200 | 83 | 430 |
| Example IV | 310 | 100 | 540 |
| Non-Crosslinked | 160 | 45 | 450 |

TABLE III

Mechanical Properties of Crosslinked vs Non-Crosslinked Propellants at 120° F.

| Sample | Tensile Strength (psi) | Elongation (%) | Modulus (psi) |
|---|---|---|---|
| Example I | 89 | 65 | 450 |
| Example II | 168 | 75 | 350 |
| Example III | 246 | 92 | 460 |
| Non-Crosslinked | 60 | 36 | 250 |

The above data show that superior mechanical properties are achieved by the use of the prepolymer technique and leads to the following conclusions:

1. Higher elongation throughout a wide temperature range;
2. High tensile strength and modulus at elevated temperatures;
3. Lower modulus at low temperatures;
4. Good mechanical properties at very low polymer levels (10%);
5. More safety in propellant manufacturing.

Safety in manufacturing is an added bonus which is very important as far as propellant production is concerned. The prepolymer desensitizes nitroglycerin and still allows one to make high impulse propellants with good mechanical properties. To achieve the same impulse with uncrosslinked nitrocellulose, one needs a very low nitrocellulose content and 90 – 100% nitroglycerin casting solvent. This not only leads to serious sensitive processing operations, but also to inferior mechanical properties as well.

The prepolymer used in the above propellant formulations is a reaction product of 2,4-tolylene diisocyanate and the polyester of diethylene glycol and adipic acid. The polyglycoladipate is formed with an excess of diethylene glycol to provide terminal hydroxyl groups on both ends of the chain. The polyester is thought to have the following structure and properties:

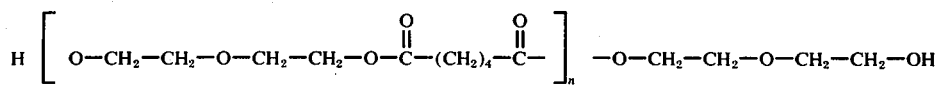

| | | |
|---|---|---|
| Heat of combustion | - | 1791 Kcal/mole |
| Heat of formation | - | 413.8 Kcal/mole = 1.284 Kcal/gm |
| Heat of explosion | - | 628 cal/gm |
| Molecular weight | - | 322.36 |
| Empirical formula | - | $C_{14}H_{26}O_8$ |
| Density | - | 1.20 gm/cc |

The prepolymer is formed through reaction between the diisocyanate and the hydroxyl groups on the end of the polyester (two parts tolylene diisocyanate and one part polyglycoladipate). The second isocyanate group of the diisocyanate is then free to further react and crosslink with the hydroxyl groups in the nitrocellulose via urethane linkages. The simplest such diisocyanate modified polyester would be the following:

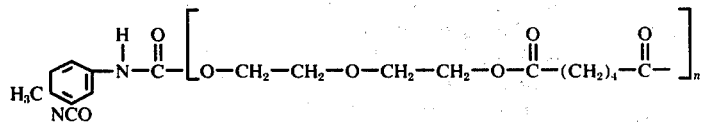
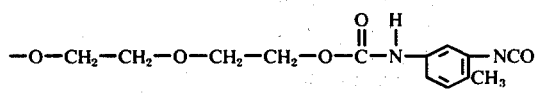

| | |
|---|---|
| Empirical formula | $C_{32}H_{38}O_{12}N_4$ |
| Molecular weight | 670.69 |
| Density | 1.21 gm/cc |
| Heat of combustion | 3811 Kcal/mole |
| Heat of formation | 496.6 Kcal/mole; - 0.740 Kcal/gm |
| Heat of explosion | 267 cal/gm |

The fact that it is necessary to make the prepolymer rather than to react the tolylene diisocyanate glycol and nitrocellulose in situ can be shown from the following data in Table IV. Here the two ways of using polyglycoladipate are contrasted and the resultant mechanical properties tabulated. In one case the prepolymer of polyglycoladipate and tolylene diisocyanate was used to crosslink nitrocellulose, and in the other case polyglycoladipate (PGA), tolylene diisocyanate (TDI), and nitrocellulose (NC) were allowed to react in situ. The amounts used of each material were approximately the same in both cases. The mechanical properties of the binder phase (all but aluminum and cyclotetramethylenetetranitramine) were determined from films. The mechanical properties of the resulting propellants were determined from appropriate tensile specimens. 7

TABLE IV

The Effect of PGA-TDI Prepolymer vs PGA, TDI Mixture on Binder and Propellant Mechanical Properties

| Sample | Modulus (psi) | Tensile Strength (psi) | Elongation (%) |
|---|---|---|---|
| Binder A | 1280 | 119 | 50 |
| Binder B | 22 | 91 | 400 |
| Propellant A' | 350 | 91 | 45 |
| Propellant B' | 790 | 140 | 80 |

Binder A = $\dfrac{NC - PGA - TDI}{35\%}$ ; $\dfrac{NG}{65\%}$

Binder B = $\dfrac{\text{Prepolymer of PGA and TDI} + NC}{35\%}$ ; $\dfrac{NG}{65\%}$ Propellant A' formulation =
```
NC  -   6.7
PGA -   6.0
TDI -    .9
HMX - 41.0
Al  - 20.0
NG  - 25.0
NDPA-    .4
```

All ingredients reacted in situ.

| Propellant B' formulation = | NC - | 6.7 |
|---|---|---|
| | Prepolymer PGA and TDI - | 6.9 |
| | HMX - | 40.0 |
| | Al - | 20.0 |
| | NG - | 25.0 |
| | NDPA - | .4 |

Prepolymer of PGA and TDI was prepared first then reacted with NC, etc.

Superior mechanical properties are apparent by use of the prepolymer technique disclosed in this invention. Furthermore, the mechanical properties at low temperatures are not improved with polyglycoladipate (PGA) unless a prepolymer is made.

Even in the situation where perhaps low temperature requirements are not important, the use of the prepolymer method is preferred for crosslinking for the following reasons:

1. In order to get maximum impulse from the composite modified double base ingredients the polymer level must be kept as low as possible (5 – 10%).

2. One cannot make low polymer propellants having useful mechanical properties by the in situ technique, that is, addition of tolylene diisocyanate (TDI) to a mixture of polyglycoladipate (PGA) and nitrocellulose (NC). The resultant propellants are too soft and in most cases cannot be cured. Apparently not enough polyglycoladipate becomes attached to nitrocellulose (thus effectively increasing the polymer level) because of the many ways tolylene diisocyanate can react. Tolylene diisocyanate can react alone thus serving as a chain extender; one isocyanate group of tolylene diisocyanate can react with nitrocellulose and the other with polyglycoladipate creating an appendage which will not contribute toward improved mechanical properties; two moles of tolylene diisocyanate will react with one mole of polyglycoladipate and the resultant diisocyanate will react with nitrocellulose, but this is unlikely to happen in the in situ technique. However, this is exactly what must happen to get good mechanical properties at low temperatures and low polymer levels. Making the prepolymer first and then reacting it with nitrocellulose makes sure that the desired reaction takes place. This in effect increases the polymer level which is very important when it is near 5% and every bit is needed for tensile strength in order to insure the physical integrity of the propellant.

The examples used to illustrate the present invention were chosen out only to show mechanical properties, but also to demonstrate that these could be obtained with formulations leading to very high impulse.

Even better mechanical properties should be possible with formulations containing higher polymer levels. Furthermore, the nitrocellulose/polyglycoladipate-tolylene diisocyanate prepolymer ratio can be changed to optimize mechanical properties for appropriate applications. As the nitrocellulose/polyglycoladipate-tolylene diisocyanate prepolymer ratio is increased, propellants with high tensile strength and modulus should result, which would be better for formulations which may find applications at ambient or high temperatures. If the ratio is decreased, increased elongation and lower modulus results which would be suitable for low temperature applications.

Obviously many modifications and variations of the present invention are possible in the light of the above teachings. It is therefore to be understood that within the scope of the appended claims the invention may be practiced otherwise than as specifically described.

What is claimed is:

1. A propellant formulation comprising the following ingredients:
   Nitrocellulose
   Prepolymer of polyglycoladipate and 2,4-tolylene diisocyanate
   Nitroglycerin
   Cyclotetramethylenetetranitramine
   Aluminum
   2-Nitrodiphenylamine.

2. A propellant formulation comprising the following ingredients:

| Ingredients | Percent by weight |
|---|---|
| Nitrocellulose | 9 |
| Prepolymer of polyglycoladipate and 2,4-tolylene diisocyanate | 6 |
| Nitroglycerin | 26 |
| Cyclotetramethylenetetranitramine | 40 |
| Aluminum | 18 |
| 2-Nitrodiphenylamine | 1. |

3. A method for the preparation of a crosslinked propellant which comprises the following steps:
   1. Dissolving polyglycoladipate and tolylene diisocyanate in nitroglycerin containing 2-nitrodiphenylamine;
   2. Evacuating the resultant solution to remove air;
   3. Mixing dry nitrocellulose into said solution until a viscous mixture results;
   4. Adding cyclotetramethylenetetranitramine to said mixture and stirring thoroughly;
   5. Stirring aluminum into the mixture for about 15 minutes until a slurry results;
   6. Vacuum casting said slurry into molds; and
   7. Curing for about five days at 120° F.

4. A method for the preparation of a propellant grain which comprises
   1. reacting polyglycoladipate and tolylene diisocyanate to form a prepolymer;
   2. dissolving said prepolymer in nitroglycerin containing 2-nitrodiphenylamine;
   3. mixing into the resultant solution nitrocellulose, cyclotetramethylenetetranitramine, and aluminum in the order named until a homogenous slurry results;
   4. casting said slurry into molds; and
   5. curing for five days at 120° F.

5. A method for the preparation of crosslinked nitrocellulose which comprises:
   reacting the prepolymer of polyglycoladipate and 2,4-tolylene diisocyanate with nitrocellulose and nitroglycerin at ambient temperature for about three minutes.

6. A propellant composition consisting essentially of:
   the prepolymer of polyglycoladipate and 2,4-tolylene diisocyanate;
   nitrocellulose, and
   nitroglycerin.

7. A propellant composition consisting essentially of:

| Ingredients | Percent by weight |
|---|---|
| Prepolymer of polyglycoladipate and 2,4-tolylene diisocyanate and nitrocellulose; | 35 |
| Nitroglycerin | 65. |

8. A composition comprising
   a crosslinking agent consisting of a prepolymer which is a solvent for nitrocellulose and miscible with nitroglycerin;
   nitrocellulose; and,
   nitroglycerin.

* * * * *